United States Patent [19]

Uys

[11] Patent Number: 4,909,996

[45] Date of Patent: Mar. 20, 1990

[54] OZONE GENERATOR

[76] Inventor: Richard Uys, P.O. Box 8509, Fredericksburg, Va. 22404

[21] Appl. No.: 293,439

[22] Filed: Jan. 4, 1989

[51] Int. Cl.⁴ .................... B01J 19/08; B01J 19/12
[52] U.S. Cl. .................... 422/186.07; 422/186.08; 422/186.14
[58] Field of Search .................... 422/186.07, 186.08, 422/186.12, 186.14, 186.18; 204/176

[56] References Cited

U.S. PATENT DOCUMENTS

| | | | |
|---|---|---|---|
| 1,379,776 | 5/1921 | Napier | 422/186.07 |
| 1,839,876 | 1/1932 | Hartman | 422/186.07 |
| 2,127,229 | 8/1938 | McRae | 204/32 |
| 2,309,616 | 1/1943 | Bagby et al. | 204/317 |
| 2,345,798 | 4/1944 | Daily | 204/318 |
| 2,744,865 | 5/1956 | Penning | 204/319 |
| 2,906,686 | 9/1959 | Trub | 204/317 |
| 2,989,632 | 6/1961 | Olson et al. | 422/186.07 |
| 3,198,726 | 8/1965 | Trikilis | 204/320 |
| 3,344,061 | 9/1967 | Kellum | 422/186.07 |
| 3,438,136 | 4/1969 | Raymond | 422/186.07 |
| 3,457,160 | 7/1969 | Fortier | 422/186.07 |
| 3,565,776 | 2/1971 | Arff | 204/321 |
| 3,812,370 | 5/1974 | La Violette | 422/186.04 |
| 4,349,511 | 9/1982 | Owen | 422/186.07 |

Primary Examiner—Howard J. Locker
Attorney, Agent, or Firm—Birch, Stewart, Kolasch & Birch

[57] ABSTRACT

An ozone generator comprising at least one but preferably a plurality of electrostatic ozone generating units located in a first enclosed compartment and being individually powered by respective transformers which are located in a second enclosed compartment and which are air cooled by blower means. The air flowing over the transformers is then fed into the compartment including the ozone generating units where ozone is generated and fed therefrom. In another embodiment, a booster is coupled to the ozone generating compartment for blending a large volume of outside air with the generated ozone and includes another housing or compartment including second blower means therein as well as a bifurcated input mixing tube having a pair of input arms and a single output arm and wherein one of the input arms is connected to the second blower means while the other input arm is connected to the ozone generating compartment. The single output arm delivers a relatively large volume of an air and ozone mixture into the surrounding atmosphere.

9 Claims, 3 Drawing Sheets

OZONE GENERATOR

BACKGROUND OF THE INVENTION

This invention relates generally to apparatus for treating atmospheric air within a predetermined area and more particularly to apparatus for generating ozone for use as a deodorizer and air purifier within the predetermined area and its surrounding environment.

Ozone generators for supplying ozone to a localized region such as a room or other type of an enclosed area is generally known. Such apparatus typically comprises a housing in which there is located one or more ozone generating units which when energized produce ozone gas which is then fed from the housing to the surrounding air where it operates to clean the environment of pollution, odors, bacteria, mildew, mold, bad air viruses, etc. Such apparatus is particularly applicable in the food industry and factories where a large amount of contaminants are present in the atmosphere. Generally, each ozone generator unit includes a pair of electrodes separated by a dielectric member and which are activated from a high voltage source, for example, a high voltage step-up transformer connected to the AC line voltage. An electrical discharge occurs between the electrodes of the ozone generator, causing gaseous ozone to be produced.

To cool the transformer and improve the transfer of the ozone generated from inside the housing to the surroundings, some type of air circulator, such as a fan or blower, is normally installed on or in the housing for not only drawing air into the housing, but for forcing air including the generated ozone out of the housing. As a result of the inclusion of a blower or fan, however, air contaminated with such undesirable elements such as oil, grease or water, is drawn into the apparatus and blown into the main enclosure and onto the electrodes and the means utilized to support these electrodes, e.g. glass tubes. When a glass tube gets wet with oil, grease or water, the high voltage on the inside of the tube and the high voltage on the outside of the tube created by the conductor electrode make contact around the end of the wet tube which then causes the transformer to heat and eventually break down, thus rendering the apparatus non-operational.

Accordingly, it is an object of the present invention to provide an improvement in apparatus for treating air in a localized environment.

It is a further object of the invention to provide an improvement in ozone generators.

And yet a further object of the invention is to provide an improved, safe and durable ozonizer for applications requiring air purification and deodorization.

SUMMARY

Briefly, the foregoing and other objects of the invention are achieved by an ozone generator comprising at least one but preferably a plurality of electrostatic ozone generating units located in a first enclosed compartment and being individually powered by respective transformers which are located in a second enclosed compartment and which are air cooled by blower means. The air flowing over the transformers is then fed into the compartment including the ozone generating units where ozone is generated and fed therefrom, the separate transformers providing increased surface area and heat transfer efficiency as compared with a single large transformer of equal power. The electrical isolation of the transformers preclude the failure of the system due to an individual electrical fault in one or more of the generating units. Additionally, the invention is comprised of a booster unit for blending a large volume of outside air with the generated ozone and includes another housing or compartment including second blower means therein as well as a bifurcated input mixing tube having a pair of input arms and a single output arm and wherein one of the input arms is connected to the second blower means while the other input arm is connected to the compartment including the ozone generator unit. The single output arm delivers a relatively large volume of an air and ozone mixture into the surrounding atmosphere.

DETAILED DESCRIPTION OF THE DRAWINGS

A complete understanding of the subject invention will be obtained when the following detailed description is considered together with the accompanying drawings in which.

DETAILED DESCRIPTION OF THE PREFERRED EMBODIMENTS

Figure 1:
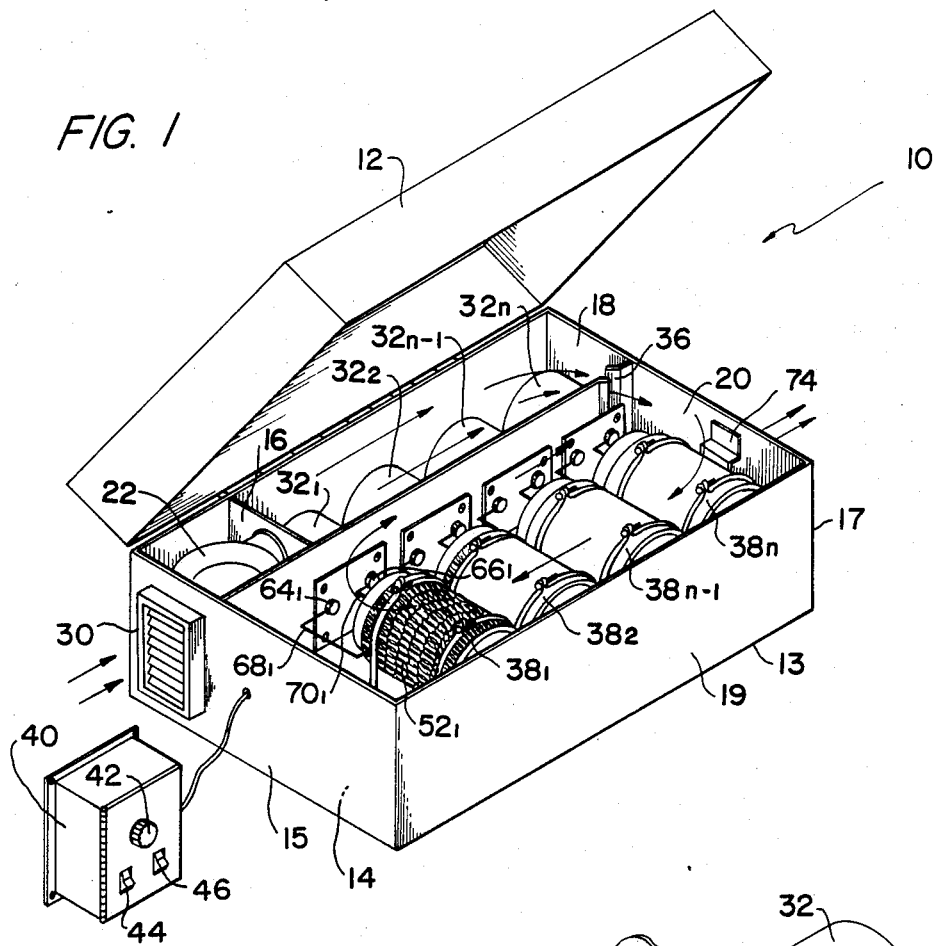
FIG. 1 is a perspective view generally illustrative of a first embodiment of the invention.

Referring now to the drawing figures wherein like reference numerals refer to like components throughout, reference is first made to FIG. 1 where reference numeral 10, for example, denotes a generally rectangular metal or plastic housing 10 including a hinged lid 12 which may include a lock, not shown, and a lower body portion 14 having three compartments 16, 18 and 20. The compartment 16 is utilized for the location of means for generating air flow through the compartments 18 and 20. The compartment 16 accordingly houses an electrical fan or blower 22 which is mounted on a partition wall member 24 including an opening 26 for feeding air into the adjoining compartment 18. The blower compartment 16 additionally includes an air inlet opening 28 which is covered by an intake filter element 30 of any convenient design.

The compartment 18 comprises an elongated compartment including a plurality of high voltage step-up transformers $32_1, 32_2, 32_{n-1}, \ldots 32_n$ which are mounted on a common internal wall 34 which separates the compartments 18 and 20. As can be seen, the transformers $32_1 \ldots 32_n$ are oriented such that the air flow generated by the blower 22 is forced over the winding portions thereof to cool the transformers during operation. At the far end of the wall 34 from the blower compartment 16, there is located at least one opening 36 where the cooling air flowing over the transformers $32_1 \ldots 32_n$ passes from compartment 18 into the compartment 20 which as shown includes a major portion of the lower housing portion 14. The compartment 20 comprises an ozone generator compartment in which are located a plurality of electrostatic ozone generator units $38_1, 38_2,$ $38_{n-1}, \ldots 38_n$ equal in number to the number of transformers $32_1 \ldots 32_n$ located in the transformer compartment 18. With such a configuration, one transformer $32_i$ is utilized for individually energizing a single generator unit $38_i$. With one independent ozone generator unit being coupled to a respective transformer, should any unit or transformer fail, the remaining units will continue to operate normally.

Compartment 18 is also provided with a top cover (not shown) for providing a sealed chamber between the inlet 30 and the outlet opening 36.

Control for the transformers $32_1 \ldots 32_n$ is provided by a separate rheostat housing 40 including a resistive type rheostat or potentiometer 42 for coupling AC power in parallel to the transformers located in the transformer compartment 18. Additionally, AC power is fed from the rheostat housing 42 to power the fan or blower 22 located in the blower compartment 16. The rheostat housing 40 additionally includes an on/off AC power switch 44 and when desirable can include selector switch means, not shown, for energizing selected numbers of the transformers $32_1 \ldots 32_n$ and thus control the power output and the amount of ozone generated for particular application. The rheostat housing 40 also normally includes a fuse device 46 which might be, for example, a manual type circuit breaker.

Figure 3:
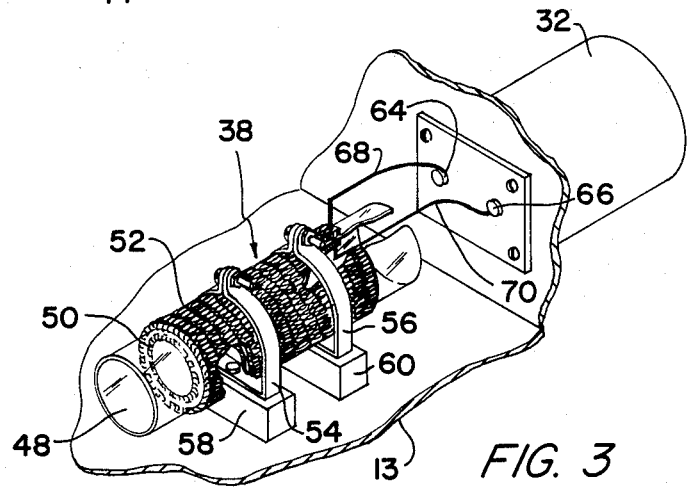
FIG. 3 is a perspective view illustrating the details of one of the ozone generating electrode units shown in FIGS. 1 and 2.

All of the electrostatic ozone generator units $38_1 \ldots 38_n$ are of identical construction as shown in FIG. 3. There one of the units, for example $38_1$, is comprised of an elongated tubular insulator member 48, typically being made of glass, and having an inner and outer electrode member 50 and 52 located thereon. Both electrode members 50 and 52 are shown formed of tubular sections of wire mesh. The wire mesh of the outer electrode is held in place by a pair of adjustable clamps 54, and 56 which fasten to a pair of stand-off insulators 58 and 60 which are fastened to the inside surface of the bottom wall 13 of the lower housing portion 14.

Each of the transformers $32_1 \ldots 32_n$, moreover, includes a pair of high voltage output terminals $64_1, 66_1 \ldots 64_n, 66_n$ which couple across respective secondary windings, not shown. The output terminals, in turn, are respectively coupled to the outer and inner wire mesh electrodes $52_1, 50_1 \ldots 52_n, 50_n$ by respective high voltage leads $68_1, 70_1 \ldots 68_n, 70_n$.

When each of the ozone units $38_1 \ldots 38_n$ are electrostatically energized by respective high voltages applied from a respective transformer $32_1 \ldots 32_n$, ozone is generated within the compartment area 20 and due to the forced air flow caused by the blower 22, an air-ozone mixture is caused to exit the housing 10 via an outlet port 72 located in the far wall 17 which is opposite the input end wall 15. It should be noted, however, that when desirable the outlet port 77 could be located in either the other end wall 15 or the relatively longer adjoining side wall 19.

In order to prevent someone from reaching inside the ozone generator compartment 20 when the lid 12 is closed, an internal entry prevention shield member 74 is fastened to the inside of the side wall 17 as shown.

It should be pointed out that the location of the high voltage excitation transformers $32_1 \ldots 32_n$ and the ozone generator units $38_1 \ldots 38_n$ in separate compartments 18 and 20 serve a very important purpose in addition to that already noted with respect to receiving cooling air from the blower 22. The isolation provided by the wall member 34 additionally prevents the transformers from being corroded by the ozone generated within the compartment 20. Furthermore, the heat generated by the ozone generator units $38_1 \ldots 38_n$ is prevented from reaching the interior of the transformer compartment 18, thus further protecting the transformers $32_1 \ldots 32_n$ from the heat in the ozone generator compartment. Additionally, by also isolating the fan or blower 22 from the ozone compartment 20, it prevents ozone from attacking the blower or fan 22 which tends to shorten the life span, due to excessive ozone corrosion and heat.

What has been shown and described up to this point is an ozone generator configuration wherein each of the ozone generator units are electrically separate from each other and are energized by individual transformers. An additional embodiment of the invention is shown in FIG. 4 and comprises apparatus which now includes an air-ozone booster unit 76 attached to or integral with the ozone generator housing 10.

Figure 4:
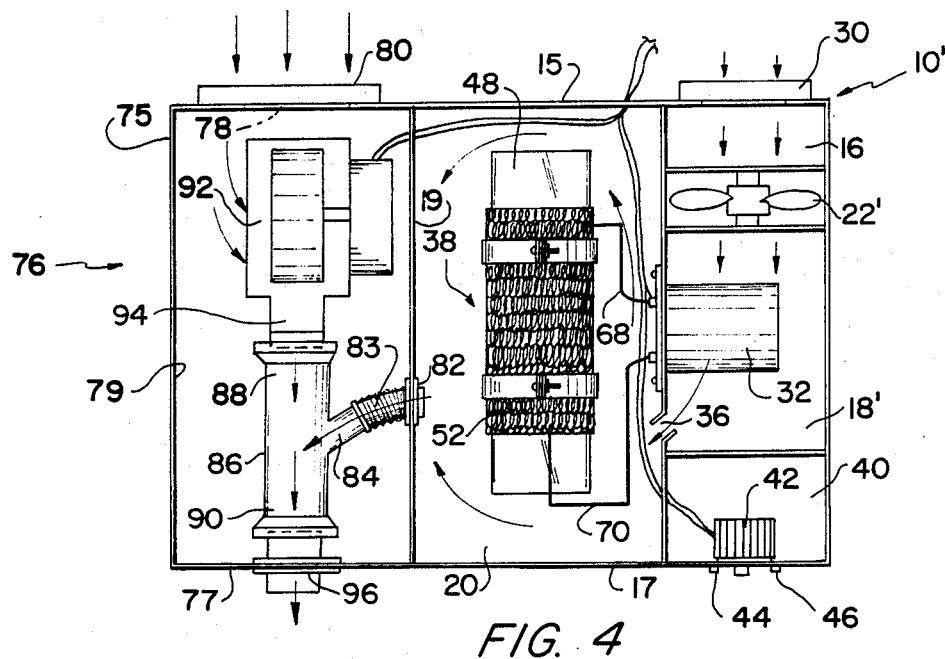
FIG. 4 is a top plan view generally illustrative of a second embodiment of the subject invention.

As shown in FIG. 4, reference numeral 10' denotes a modified housing having a booster unit 76 integrated therewith. For simplicity, a single ozone generator 38 powered by a single transformer 32 are respectively located in compartments 18' and 20. Further, the control box 40 shown in FIG. 1 is now also integrated into housing 10' in line with the fan compartment 16 and the now shortened transformer compartment 18'. The booster unit 76 shares a common elongated side wall 19 with the ozone generator compartment 20 and further includes a pair of relatively shorter end walls 75 and 77 which are extensions of the end walls 15 and 17 and one outer-side wall 79 which is Parallel to the non extension side wall 19. A second air inlet port 78 is formed in the end wall 75 and is covered by an air filter 80. Thus two separate air inlets 28 and 78 are provided on the same end of the housing 10'.

Compartment 18' is also provided with a top cover (not shown) for providing a sealed chamber between inlet 30 and outlet opening 36.

Whereas in the first embodiment the ozone outlet port 72 was located in the side wall 17, in the present embodiment an opening 82 is now provided in the common side wall 19 where ozone generated in the compartment 20 is fed by a coupling 83 into a relatively smaller diameter side arm 84 of a bifurcated or generally Y shaped blending or mixing tube or pipe 86 having a relatively larger end 88 and an output end 90. The input end 88 of the tube 86 is coupled to a second air supply means shown as a blower 92. In FIG. 4, the blower 92 includes an output nozzle 94 which is connected into the input end 88 of the mixing pipe 86. Filtered input air is drawn through the opening 78 where it enters the blower 92 from the side as shown. Forced air is directed into the pipe member 86 where ozone is fed thereto from the side arm 84 and the mixture is fed out of the booster housing 76 from an outlet port member 96 now located in the end wall 77.

The blower 92 located in the booster housing 76 preferably comprises a higher volume blower than that of the blower 22' so that what is provided is apparatus which is able to take a relatively low volume of ozone and air and blend it with a relatively high volume of outside air. Thus the first relatively smaller blower 22' is used to cool the transformer 32 in a separate compartment 18' adjoining the main compartment 20 housing the ozone generator unit 38. The ozone generated in the compartment 20 is then fed into the booster unit 76 where it mixes with a relatively high volume of air which is forced out into the atmosphere by the second blower 92.

Booster housing 76 is provided with a top cover (not shown) to provide a sealed housing between inlet 78 and outlet port 96. More than one outlet port 96 may be provided if desired.

Figure 2:
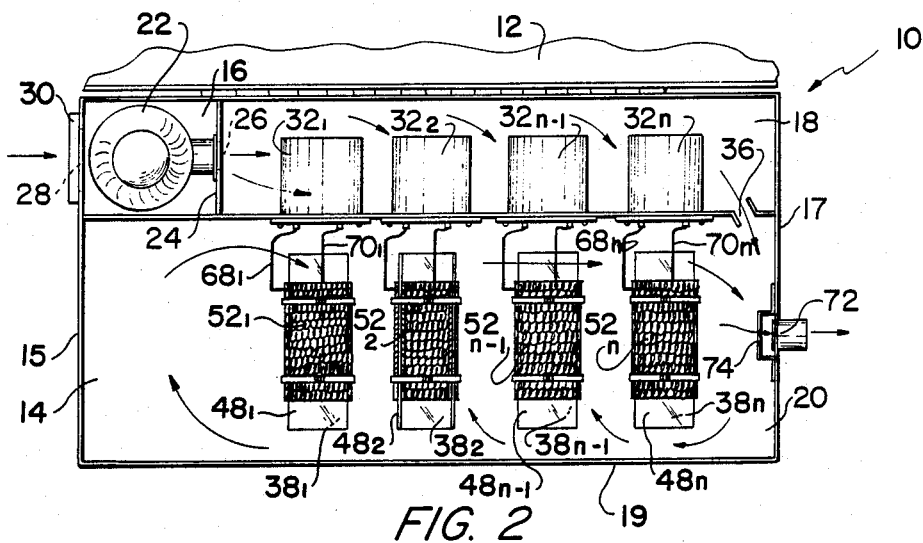
FIG. 2 is a top plan view of the embodiment shown in FIG. 1.
Figure 5:
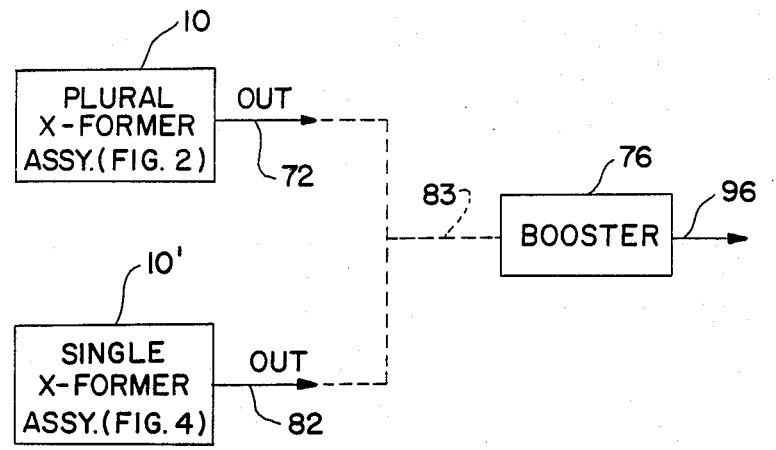
FIG. 5 is a mechanical schematic diagram further illustrative of the invention.

While the booster unit 76 shown in FIG. 4 is integrated with the housing 10', it should be noted that the booster unit when desirable can be attached to the ozone generator as configured in FIGS. 1 and 2. Thus what is intended to be shown by FIG. 5 is that the booster unit 76 can be used in combination with either a single transformer assembly 10' as shown in FIG. 4, or a multiple transformer assembly 10 as shown in FIG. 2. All that is required is to provide the required ozone coupling from the output of the ozone generator section into the side arm 84 of the blending pipe 86 shown in FIG. 4.

Having thus shown and described what is at present considered to be the preferred embodiments of the invention, it should be noted that the same has been made by way of illustration and not limitation. Accordingly, all modifications, alterations add changes coming within the spirit and scope of the invention are herein meant to be included.

I claim:

1. Apparatus for generating ozone, comprising:
   a housing;
   at least two mutually isolated compartments in said housing;
   a plurality of electrostatic ozone generating units located in one of said compartments;
   a like plurality of transformers located in the other of said compartments for independently supplying electrical power to individual ozone generating units of said plurality of generating units;
   first blower means for supplying air to said other compartment for cooling said transformers,
   means for coupling air from said other compartment to said one compartment,
   output means for feeding ozone mixed with air out of said one compartment to the surrounding atmosphere said output means including an outlet port, and additionally including a booster unit coupled to said outlet port, said booster unit comprising:
      second blower means for supplying a relatively high volume of air as compared to the air generated by the first blower means, aid second blower means being physically isolated from any direct exposure to ozone from said ozone generating units,
      means for mixing ozone from said outlet port with said high volume of air; and
      second output means for delivering a mixture of ozone and air from said mixing means exteriorly of said apparatus; and
   whereby the isolation of said two compartments from each other prevents ozone corrosion of said transformer and heat generated by said ozone generating unit is prevented from affecting the operation of said transformers.

2. The apparatus as defined by claim 1 wherein said booster unit includes housing means for supporting said second fan means for supplying said high volume of air, said mixing means, and said second output means.

3. The apparatus as defined by claim 1 wherein said booster unit includes a third compartment in said housing adjacent said one compartment for supporting said second fan means for supplying said high volume of air, said mixing means, and said second output means.

4. The apparatus as defined by claim 1 wherein said second output means comprises a second outlet port, said mixing means comprises a tubular member having a pair of input members and a single output member and wherein one of said input members is connected to said second fan means for supplying a relatively high volume of air, the other of said input members is connected to said outlet port of said one compartment and said output member is connected to said second outlet port.

5. An air booster unit for ozone generating apparatus having at least one ozone generating unit coupled to and energized by a transformer physically separated and isolated from each other in a housing and having first blower means for supplying air to the transformer and ozone generating unit, said booster unit comprising:
   second blower means for supplying a relatively high volume of air as compared to the volume of air generated by the first blower means, said second blower means being physically isolated from any direct exposure to ozone generated by said ozone generated unit,
   means for mixing ozone from said ozone generating unit with said high volume of air; and
   outlet means for delivering a mixture of ozone and air from said mixing means exteriorly of said apparatus.

6. The booster unit as defined by claim 5 wherein said booster unit includes housing means for supporting said second fan means for supplying said high volume of air, said mixing means, and outlet means.

7. The booster unit as defined by claim 5 and wherein said booster unit includes a separate compartment for supporting said second fan means for supplying said high volume of air said mixing means, and said outlet means.

8. The booster unit as defined by claim 5 wherein said mixing means comprises a tubular member having a pair of input members and a single output member and wherein one of said input members is connected to sad second fan means for supplying a relatively high volume of air, the other of said input members is connected to ozone generated by said ozone generating unit and said output member is connected to said outlet means.

9. The booster unit as defined by claim 8 wherein said one input member and said output member are mutually coextensive and of the same size and said other input member comprises a branch member of relatively smaller size.

* * * * *